US008150882B2

(12) United States Patent
Meek et al.

(10) Patent No.: US 8,150,882 B2
(45) Date of Patent: Apr. 3, 2012

(54) MAPPING FROM OBJECTS TO DATA MODEL

(75) Inventors: Colin Joseph Meek, Redmond, WA (US); Jeffrey M. Derstadt, Sammamish, WA (US); Arthur John Cerdic Vickers, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 347 days.

(21) Appl. No.: 12/396,471

(22) Filed: Mar. 3, 2009

(65) Prior Publication Data

US 2010/0228761 A1 Sep. 9, 2010

(51) Int. Cl.
*G06F 7/00* (2006.01)
*G06F 17/30* (2006.01)
(52) U.S. Cl. ........................................ 707/792; 707/812
(58) Field of Classification Search .................... None
See application file for complete search history.

(56) References Cited

U.S. PATENT DOCUMENTS

| | | | | |
|---|---|---|---|---|
| 5,627,979 | A * | 5/1997 | Chang et al. | 715/763 |
| 5,729,739 | A * | 3/1998 | Cantin et al. | 1/1 |
| 5,734,887 | A * | 3/1998 | Kingberg et al. | 1/1 |
| 5,754,851 | A * | 5/1998 | Wissner | 1/1 |
| 5,826,077 | A | 10/1998 | Blakeley et al. | |
| 6,134,559 | A | 10/2000 | Brumme et al. | |
| 6,532,465 | B2 | 3/2003 | Hartley et al. | |
| 6,609,123 | B1 * | 8/2003 | Cazemier et al. | 1/1 |
| 6,766,326 | B1 * | 7/2004 | Cena | 707/808 |
| 6,985,905 | B2 * | 1/2006 | Prompt et al. | 707/829 |
| 6,988,109 | B2 | 1/2006 | Stanley et al. | |
| 6,999,956 | B2 * | 2/2006 | Mullins | 1/1 |
| 7,426,522 | B2 | 9/2008 | Nouri et al. | |
| 2003/0074436 | A1 * | 4/2003 | Gieseke | 709/223 |
| 2004/0015515 | A1 * | 1/2004 | Beisiegel et al. | 707/103 Y |
| 2004/0181775 | A1 * | 9/2004 | Anonsen et al. | 717/104 |
| 2004/0215629 | A1 * | 10/2004 | Dettinger et al. | 707/100 |
| 2004/0254924 | A1 * | 12/2004 | Dettinger et al. | 707/4 |
| 2005/0044089 | A1 * | 2/2005 | Wu et al. | 707/100 |
| 2005/0076046 | A1 * | 4/2005 | Goldsack | 707/101 |
| 2005/0120332 | A1 * | 6/2005 | Martin et al. | 717/105 |
| 2006/0101423 | A1 * | 5/2006 | Aharoni et al. | 717/136 |
| 2006/0195460 | A1 * | 8/2006 | Nori et al. | 707/100 |
| 2006/0195477 | A1 * | 8/2006 | Deem et al. | 707/104.1 |
| 2006/0206468 | A1 * | 9/2006 | Dettinger et al. | 707/3 |
| 2006/0224590 | A1 * | 10/2006 | Boozer et al. | 707/9 |
| 2007/0225719 | A1 * | 9/2007 | Stone et al. | 606/72 |
| 2007/0255717 | A1 * | 11/2007 | Baikov et al. | 707/10 |

(Continued)

OTHER PUBLICATIONS

A data model and data structures for mving objects database, Forlizzi et al, ACM ZIGMOD 2000.*

(Continued)

*Primary Examiner* — Pierre Vital
*Assistant Examiner* — Augustine Obisesan
(74) *Attorney, Agent, or Firm* — Zete Law, P.L.L.C.; MacLane C. Key

(57) ABSTRACT

Aspects of the subject matter described herein relate to mapping from application objects to an abstract data model. In aspects, a mapper receives registrations that indicate behavior (e.g., how objects are constructed, modified, or examined) of application objects. The behavior may be specified using user-supplied expressions. The mapper aggregates this data and uses it to map application requests for data access into one or more operations that operate on the abstract data model. A data access layer may then translate the operations into actions to access data corresponding to the requests from a store. If appropriate, data obtained from the store may then be inserted into application objects as indicated by the registrations.

20 Claims, 5 Drawing Sheets

U.S. PATENT DOCUMENTS

| | | | |
|---|---|---|---|
| 2008/0091668 A1* | 4/2008 | Dettinger et al. | 707/4 |
| 2008/0270979 A1* | 10/2008 | McCool et al. | 717/108 |
| 2008/0275910 A1* | 11/2008 | Molina-Moreno et al. | 707/103 R |
| 2008/0301181 A1* | 12/2008 | Lori | 707/103 R |

OTHER PUBLICATIONS

Mapping object to a tables, Keller et al, Proceedings of EuroPloP 1997.*

Scott, "Introduction to LINQ", Retrieved at <<http://www.odetocode.com/Articles/737.aspx>>, Dec. 23, 2007, pp. 11.

"Introduction to Relational Mappings (ELUG)", Retrieved at <<http://wiki.eclipse.org/Introduction_to_Relational_Mappings_(ELUG)>>, Dec. 22, 2008, pp. 16.

Hansteen, Peter N M, "Talk Abstracts", Retrieved at <<http://spring2008.ukuug.org/talk_abstracts.html>>, Dec. 22, 2008, pp. 20.

Pattison, Ted, "COM+ Overview for Microsoft Visual Basic Programmers", Retrieved at <<http://msdn.microsoft.com/en-us/library/ms809243.aspx>>, Feb. 2000, pp. 14.

"Stevey's Blog Rants", Retrieved at <<http://steve-yegge.blogspot.com/2008/05/dynamic-languages-strike-back.html>>, May 11, 2008, pp. 85.

Wagner, Bill, "More Effective C#: Item 44: Prefer Storing Expression<> to Func<>", Retrieved at http://www.informit.com/articles/printerfriendly.aspx?p=1231460>>, Oct. 13,2008, pp. 3.

"Language Integrated Query", Retrieved at <<http://en.wikipedia.org/wiki/Linq>>, Jan. 28, 2009, pp. 8.

* cited by examiner

MAPPING FROM OBJECTS TO DATA MODEL

BACKGROUND

Object-relational mappers expose data via strongly-typed objects. There are, however, significant constraints on the implementation of the objects. For example, with an object-relational mapper, objects are assumed to implement specific patterns that are frequently at odds with best practices for an organization or school of programming.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to mapping from application objects to an abstract data model. In aspects, a mapper receives registrations that indicate behavior (e.g., how objects are constructed, modified, or examined) of application objects. The behavior may be specified using user-supplied expressions. The mapper aggregates this data and uses it to map application requests for data access into one or more operations that operate on the abstract data model. A data access layer may then translate the operations into actions to access data corresponding to the requests from a store. If appropriate, data obtained from the store may then be inserted into application objects as indicated by the registrations.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. Other definitions, explicit and implicit, may be included below.

Exemplary Operating Environment

Figure 1:
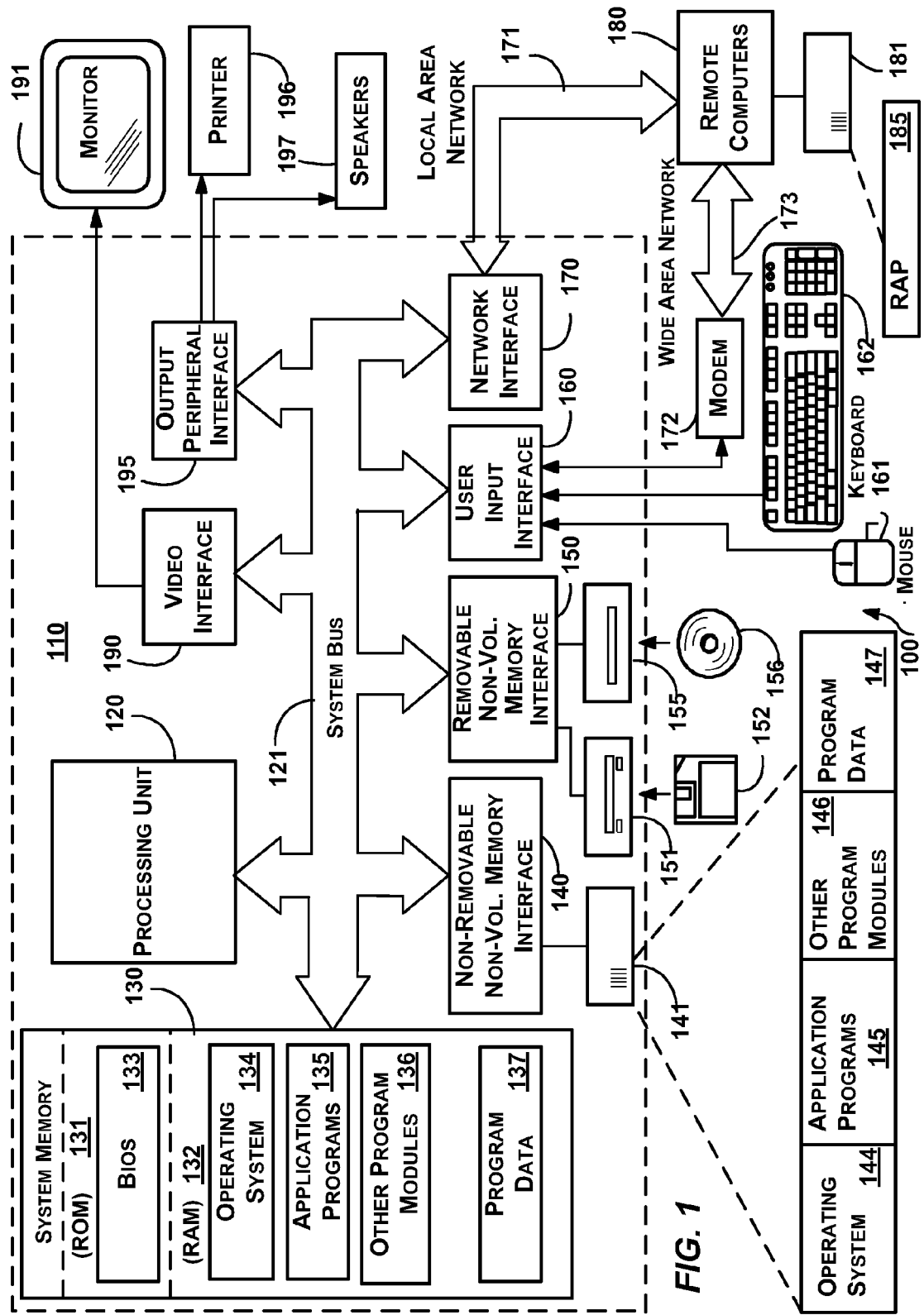
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus through a non-removable memory interface such as interface 140, and magnetic disk drive 151 and optical disc drive 155 are typically connected to the system bus by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data are given different numbers herein to illustrate that, at a minimum, they are different copies.

A user may enter commands and information into the computer 20 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Mapping

Figure 2:
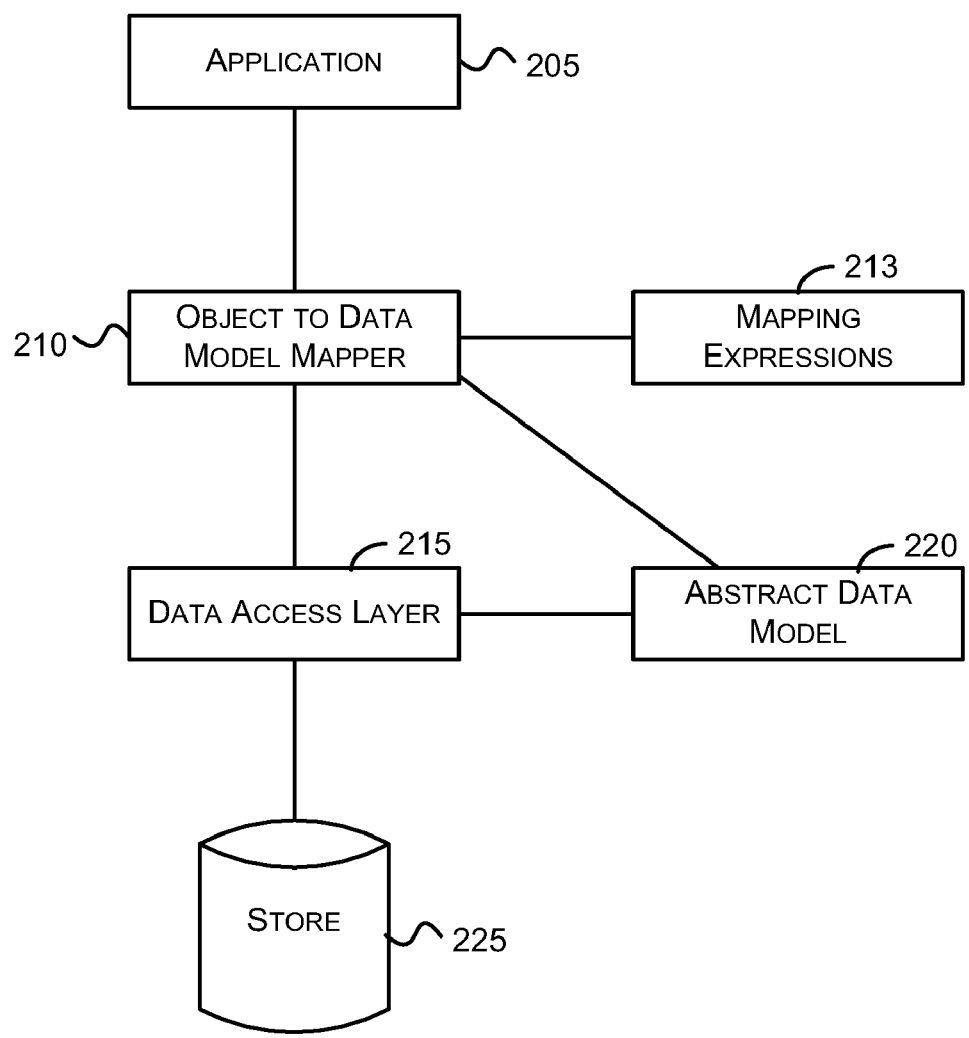
FIG. 2 is a block diagram representing an exemplary environment in which aspects of the subject matter described herein may be implemented.

As mentioned previously, object-relational mappers (ORMs) impose significant constraints on the implementation of objects that may be at odds with best practices for an organization or school of programming. FIG. 2 is a block diagram representing an exemplary environment in which aspects of the subject matter described herein may be implemented. The environment may include an application 205, an object to data model mapper 210, mapping expressions 213, a data access layer 215, an abstract data model 220, a store 225, and may include other entities (not shown). The various entities depicted in FIG. 2 (hereinafter sometimes referred to as "entities") may be located relatively close to each other or may be distributed across the world. The various entities may communicate with each other via various networks including intra- and inter-office networks and the like.

The entities may comprise or reside on one or more general or special purpose computing devices. Such devices may include, for example, personal computers, server computers, hand-held or laptop devices, multiprocessor systems, microcontroller-based systems, set top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as one or more of the entities indicated in FIG. 2 comprises the computer 110 of FIG. 1.

One or more of the entities may be implemented as one or more processes. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or may execute on a single device.

The store 225 comprises any storage media capable of storing data. The store 225 may comprise a file system, database, volatile memory such as RAM, other storage, some combination of the above, and the like and may be distributed across multiple devices. The store 225 may be read-only or read/write with respect to the data access layer 215 or the application 205.

The data access layer 215 performs operations on data in the store 225 using the abstract data model 220. The abstract data model 220 indicates how data is represented and accessed on a data store. The abstract data model 220 may include entity types, complex types, and relationships. An entity type or complex type includes a fixed number of named properties (sometimes called attributes) and may inherit from one or more other types. These properties may be primitive types (e.g. numbers, dates, strings, and the like) or complex types. In addition, an instance of an entity may include additional "open" or dynamic properties.

The data access layer 215 may perform various operations including, for example:

Construction. Construction may initialize an entity with given property values. As one example, when returning query results, the results data is packaged into a new instance of a type.

Get property value. An entity (e.g., an instance of an entity type or complex type) has properties that the application 205 may seek to read. The get property value operation obtains a property.

Set property value. An entity has properties that the application 205 may seek to change. The set property value operation may be used to change a property value.

Determine type. Application objects may be implementations of one or more types in the abstract data model. The determine type operation may be used to obtain the type of an object in the abstract data model.

Notification. An application object may notify the data access layer 215 of changes (e.g., a modification of a property). The notification operation facilitates sending a notification to the data access layer 215 when a change to an object occurs.

Other operations may also be used to access data from a data source. For example, a list operation may be used to obtain information from list data structures.

The mapping expressions 213 define actions for transforming a request from an application into operations that operate on the abstract data model 220. When a language allows it, a lambda expression may be used to register an expression. For example, a user may register an expression with a particular property. For example, for a last name property entitled "lname", a user may provide an expression such as:

$$(\text{Customer } c) => c.\text{CustLastName}(\ )$$

This expression indicates that the lname property of a Customer object c may be obtained by calling the CustLastName method of the object c.

As another example, the user may register the lname property with a different expression such as:

$$(\text{Customer } c) => c.\text{LastName}$$

This expression indicates that the lname property of a Customer object c may be obtained via the LastName property of the object c.

As yet another example, the user may register the lname property with a different expression such as:

$$(\text{Customer } c) => c[\text{"lname"}]$$

This expression indicates that the lname property of the of the Customer object c may be obtained via a lookup on the object c of the string "lname". In this example, the object c may provide a dictionary-like mechanism that allows properties to be obtained using a name of the property.

The examples above are not intended to be all-inclusive or exhaustive. In general, a user may register any expression desired. The expression may then be used, among other things, to obtain a property for a particular entity. Obtaining may include getting the property from the data access layer 215 or generating the property based on what is included in the expression. The expression may include constants, variables, operators, functions, properties, actions, remote procedure calls, service calls, or the like that may be used to obtain a property.

In some embodiments, the expression may not even use a method or property of the entity c in obtaining the property. For example, in some embodiments, the expression may initialize the property to a set value or obtain the property from a service or function call.

Entity behaviors (e.g., how an entity is constructed, modified, or examined) of the application 205 are described with respect to the above operations. The application may have a collection of objects through which the application is able to examine and manipulate application data. Objects in this collection conform to the object model of the application. The object behaviors of the application 205 indicate actions to access data associated with the objects. Access as used herein may include reading data, writing data, deleting data, updating data, a combination including one or more of the above, and the like.

Among other things, the object to data mapper 210 (herein sometimes referred to as "mapper 210") is responsible for gathering and interpreting these behaviors. Behaviors may be described using functions or actions which may be composed or layered to model complex behaviors.

Below, various declarations are described that indicate parameters that may be used to register expressions. Note that registration may be performed via a tool, programmatically (e.g., via a script, or function calls), or otherwise. In addition, exemplary syntax is given to perform the registration of exemplary expressions. There is no intent to limit aspects of the subject matter described herein to the declaration, syntax, or expressions described below. Instead, based on the teachings herein, many other forms of representing the mechanisms described above may be recognized that may also be used without departing from the spirit or scope of aspects of the subject matter described herein.

Below are two exemplary declarations that may be used to register expressions to use for constructing a new entity type or complex type:

```
1. RegisterConstructionBehavior(AbstractType,
Expression<Func<Record, ObjectType>>)
2. RegisterConstructionBehavior(AbstractType,
Expression<Func<Record, ChangeTracker, ObjectType>>)
```

AbstractType is a conceptual data type implemented by ObjectType. Record is a weakly typed object that exposes abstract data model properties corresponding to data included in the store 225. ObjectType is an entity or complex type understood by the application 205 (e.g., in the object model of the application). Expression is transparent and its logic visible to the data access system.

The ChangeTracker supports notification of changes to an instance of the ObjectType. For example, the ChangeTracker may be used to indicate a service that keeps track of changes to business objects in terms of the abstract data model. The tracker may be notified of changes to objects as they occur (sometimes referred to as the 'push' pattern) or by taking a snapshot of objects and then comparing the snapshot to a future configuration (sometimes referred to as the 'pull' pattern).

An exemplary expression for constructing an object of type Customer according to the first function declaration above may be registered using the following exemplary syntax:

```
RegisterConstructionBehavior("Customer",
(Record r) => new Customer(r.Field <string> ("fname"),
r.Field <string>("lname"));
```

The expression above indicates that a new instance of type Customer may be constructed using two fields (e.g., "fname" and "lname") from a record. This expression also indicates that both fname and lname are needed before the new instance of type Customer may be constructed using this constructor.

When a query for a set of objects is issued by the application 205, this query may be formed in terms of the application 205's own objects. The query may then be rewritten by mapper 210 in terms of operations against the abstract data model 220. The data access layer 215 may transform the query expressed in terms of the abstract data model 200 into a query appropriate for retrieving data from the store 225. When the results are returned (e.g., as records), the results may be transformed into objects understood by the application using the expression for constructing a new entity type or complex type previously registered.

An exemplary expression for constructing an object of type Customer according to the second declaration above may be registered using the following exemplary syntax:

```
RegisterConstructionBehavior("Customer",
(Record r, ChangeTracker ct) =>
{
    Customer result = new Customer(r.Field <string> ("fname"), r.Field <string>("lname"));
    result.PropertyChanging += (e, o) =>
ct.NotifyPropertyChanging(e, o);
});
```

The behavior hooks up a "property changing" event with the corresponding listener on the data access layer's change tracker. The example above is not intended to be all-inclusive or exhaustive as arbitrary notification strategies may be implemented without departing from the spirit or scope of aspects of the subject matter described herein.

Below are two exemplary declarations that may be used to register expressions to use for setting a property on an instance of an entity type or complex type:

```
1. RegisterSetter(AbstractType, Property,
Expression<Action<ObjectType, PropertyType>>)
2. RegisterSetter(AbstractType, Property,
Expression<Func<ObjectType, PropertyType, ObjectType>>)
```

The Action above does not return an object while the Func declaration above returns an instance of type ObjectType to support immutable patterns. The Property indicates the attribute/field/property in the abstract model that is being set. In the Action mentioned above, an exemplary expression may be registered for a property setter using the following exemplary syntax:

RegisterSetter("Customer", "Age", (c,a)=>c.SetAge (a));

Customer represents the ObjectType Customer while Age represents the age property of Customer.

An exemplary expression for setting a property according to the second declaration above may be registered using the following exemplary syntax:

RegisterSetter("Customer", "Age", (c,a)=>c.Age=a);

An exemplary expression for setting a property for an immutable object may be registered using the following exemplary syntax:

RegisterSetter("Customer", "Age", (c,a)=>new Customer(c.FirstName, c.LastName, a));

In this example, a new instance of type Customer is created using the properties of the passed in instance c and the age property a. Note that the instance c that is passed in does not get changed and remains immutable.

Below is an exemplary declaration that may be used to register expressions to use for getting a property on an instance of a complex type or entity type:

```
RegisterGetter(AbstractType, Property,
Expression<Func<ObjectType, PropertyType>>
```

An exemplary expression for getting a property on an instance according to the declaration above may be registered using the following exemplary syntax:

RegisterGetter("Customer", "Age", (c)=>c.Age);

An expression may be registered to set properties on an instance where the specific property is not known in advance. To do this, a name of the property may be supplied (e.g., as a string) when setting the property. The value of the property may be supplied as an object since the specific type may not be known (e.g., by the mapper 210) in advance. This mechanism is sometimes referred to herein as a "strategy". When an expression for a specific property of an ObjectType has been registered, this expression may be used instead of the expression associated with the strategy for the ObjectType.

Below are two exemplary declarations that may be used to register expressions to use for setting properties on an instance of an entity type or complex type:

```
1. RegisterSetterStrategy(AbstractType,
   Expression<Action<ObjectType, Property, object>>
2. RegisterSetterStrategy(AbstractType,
   Expression<Func<ObjectType, Property, object,
   ObjectType>>)
```

The Action declaration above indicates that an object is not to be returned while the Func declaration indicates that an instance of type ObjectType is to be returned. The instance of type ObjectType is returned to support immutable patterns. An exemplary expression for setting a property without returning an object (e.g., in mutable cases) may be registered using the following exemplary syntax:

RegisterSetterStrategy("Customer", $(c,n,v)=>c[n]=v$);

The c in the expression above indicates an instance of type Customer. The n above indicates a string that identifies the property. The v above indicates a value of the property.

An exemplary expression for setting a property and returning an instance of type ObjectType (e.g., in immutable cases) may be registered using the following exemplary syntax:

RegisterSetterStrategy("Customer", $(c,n,v)=>$new Customer$(c,n,v)$);

Similarly an expression may be registered to get properties on an instance where the specific property is not known in advance. To do this, a name of the property may be supplied (e.g., as a string) when getting the property. An instance of the property type may also be supplied in which to place the obtained property since the specific type may not be known (e.g., by the mapper 210) in advance.

Below is an exemplary declarations that may be used to register expressions to use for getting properties on an instance of an entity type or complex type:

```
RegisterGetterStrategy(AbstractType,
   Expression<Func<ObjectType, Property, object>>)
```

An exemplary expression for getting a property using a strategy may be registered using the following exemplary syntax:

RegisterGetterStrategy("Customer", $(c,n)=>c[n]$);

Here, "n" represents the name of the property type being obtained.

It some cases it may be desirable during mapping to allow instances of more than one application type to be contained in a generic type in the abstract data model 220. For example, this may be useful to avoid overloading a namespace. In these cases, it may be desirable to obtain the application type of a specific instance.

Given the following class declaration:

```
class CloudEntity: Dictionary<string, object>
{
    public long ID {get;}
    public byte[ ] Timestamp {get;}
    public string Type {get;}
}
```

An exemplary declaration that may be used to determine an application type is as follows:

```
RegisterDetermineType(
   Expression<Func<ObjectType, AbstractType>>)
```

An exemplary expression may be registered for determining the application type using the following exemplary syntax:

RegisterDetermineType((CloudEntity $c=>c$.Type);

Query Rewriting. The above behavior declarations can also be used to interpret queries written using Language Integrated Query (LINQ) or some other expression based language construct. By recognizing sub-queries matching the above behaviors, the object to data model mapper 210 may transform operations specific to the object model (getting a property value, checking the type of an instance) to the corresponding model operations. For example, a user may register the following read behavior for the property lname:

(Customer $c)=>c$.CustLastName( )

If a program includes:

var $x$=from  $c$  in  customer  where  $c$.CustLast Name( )=="Doe";

based on the previous registration, the query rewriter may recognize that c.CustLastName( ) refers to a registered property and may substitute "lname" for "CustLastName( )". This may then be used by the data access layer 215 to generate a query language statement to access the desired data. For example, the data access layer 215 may generate a corresponding SQL statement such as:

select*from Customer as $c$ where $c$.$l$name="Doe"

This query is first transformed into a query expressed in terms of the abstract data model and then transformed into a relational query that may then be sent (e.g., via the data access layer 215) to a database associated with the store 225 to obtain customers.

This mechanism above may be used, for example, to increase efficiency in obtaining data from the store 225. For example, instead of retrieving all of the customers from the database and then filtering out the unwanted customers at the data access layer 215 after the customers have been retrieved, the query rewriting allows the database to do the filtering and to return just the records desired. Furthermore, the mechanism above allows a user to indicate (e.g., via an expression) how a property is obtained and does not tie the mapper 210 to any fixed set of actions for obtaining the property.

In some cases, an application object may not support a fine-grained behavior like setting a specific property. In such cases, a series of smaller operations may be aggregated into a larger one. Consider the following object construction expression:

```
(record r)=>new MyBusinessObject(r.Field <int>
    ("ID"), r.Field<int>("X"))
```

From the expression, the mapper 210 can tell that the properties "ID" and "X" are set during construction. Using this knowledge, the mapper 210 may collapse the following sequence of low-level conceptual operations:

1. e←initialize MyBusinessObject
2. e.ID←1
3. e.X←2
4. e.Y←3 into the following sequence of operations against the actual application object type:

1. MyBusinessObject e=new MyBusinessObject(1, 2)
2. e.Y=3

This allows the construction to succeed even when a conceptual operation (like setting a property) is not supported by the object.

In addition, the use of expressions allows the mapper 210 to infer useful things about the behavior. For instance, in the above example the mapper 210 can recognize that the construction step ("new MyBusinessObject") is setting certain properties.

Although the environment described above includes various entities, it will be recognized that more, fewer, or a different combination of these entities and others may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Figure 3:
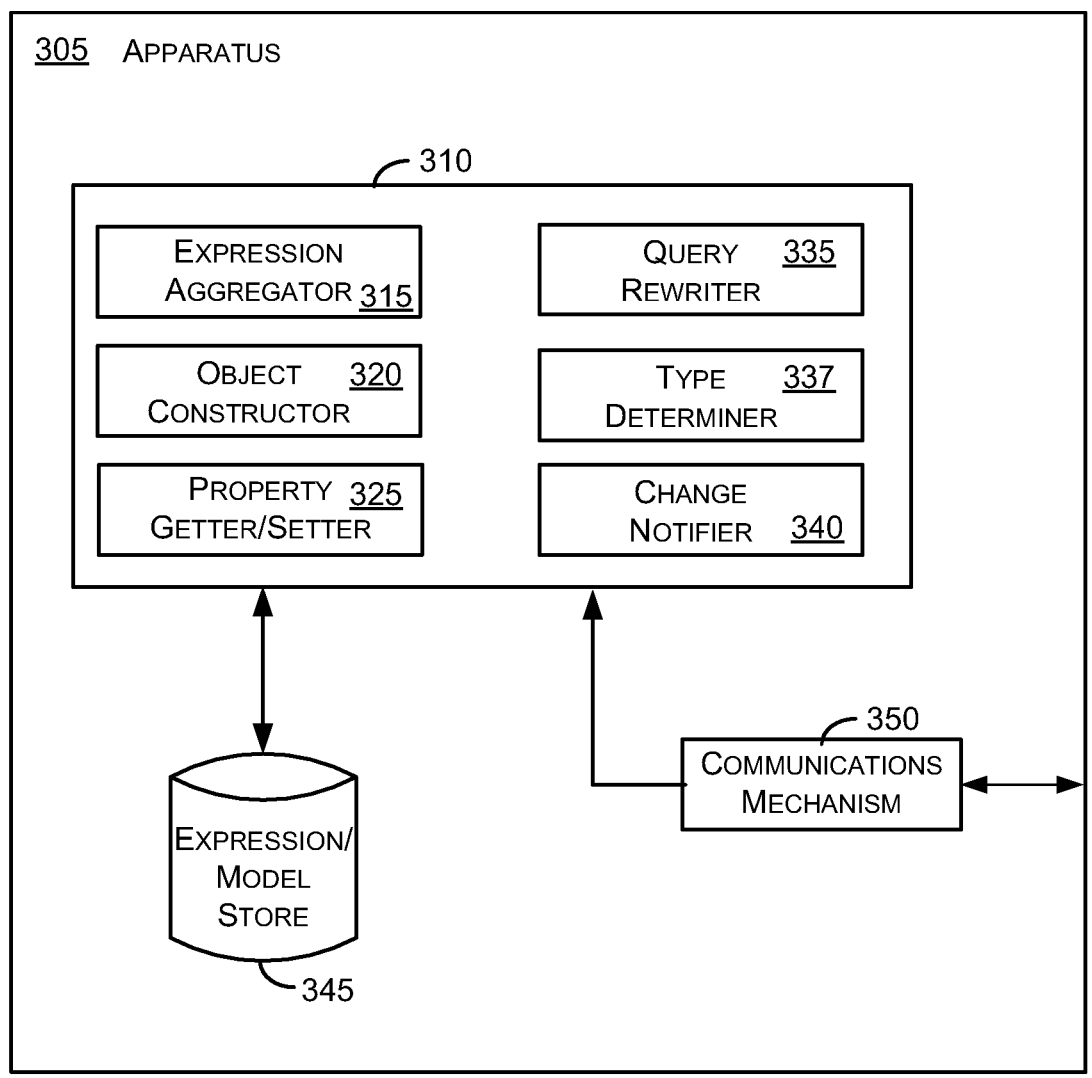
FIG. 3 is a block diagram that represents an apparatus configured with a mapper in accordance with aspects of the subject matter described herein.

FIG. 3 is a block diagram that represents an apparatus configured with a mapper in accordance with aspects of the subject matter described herein. The components illustrated in FIG. 3 are exemplary and are not meant to be all-inclusive of components that may be needed or included. In other embodiments, the components and/or functions described in conjunction with FIG. 3 may be included in other components (shown or not shown) or placed in subcomponents without departing from the spirit or scope of aspects of the subject matter described herein. In some embodiments, the components and/or functions described in conjunction with FIG. 3 may be distributed across multiple devices.

Turning to FIG. 3, the apparatus 305 may include mapping components 310, an expression/model store 345, a communications mechanism 350, and other components (not shown). The mapping components 310 may include an expression aggregator 315, an object constructor 320, a property getter/setter 325, a query rewriter 335, a type determiner 337, a change notifier 340, and other components (not shown).

The mapping components 310 correspond to the mapper 210 of FIG. 2. In some embodiments, one or more of the other entities shown in FIG. 2 may also be included in the apparatus 305.

The communications mechanism 350 allows the apparatus 305 to communicate with other entities shown in FIG. 2. The communications mechanism 350 may be a network interface or adapter 170, modem 172, or any other mechanism for establishing communications as described in conjunction with FIG. 1.

The expression/model store 345 (hereinafter sometimes referred to as "store 345") is any storage media capable of storing data. The term data is to be read broadly to include anything that may be stored on a computer storage medium. Some examples of data include information, program code including expressions, program state, program data including models, other data, and the like. The store 345 may comprise a file system, database, volatile memory such as RAM, other storage, some combination of the above, and the like and may be distributed across multiple devices. The store 345 may be external, internal, or include components that are both internal and external to the apparatus 305.

In particular, the store 345 may be operable to store and provide access to expressions that describe behavior of objects that conform to the object model of the application that uses the mapping components 310. In addition, the store 345 may also store and provide access to an abstract data model that indicates structure and relationships of data store data corresponding to the application data. In some embodiments, the abstract data model and the expressions may be stored in different stores.

The expression aggregator 315 is operable to receive an expression that describes behavior of an object and to aggregate information about the behavior together with other information about other behaviors of the object, if any, in the store 345.

Some of the mapping components (e.g., the object constructor 320, the property getter/setter 325, the type determiner 337, the change notifier 340) may be operable to receive a request from the application to access data pertaining to an object and to map the request into one or more operation that operate on the abstract data model. This mapping may be based at least in part on aggregated information, if any, about the behavior of the object.

The object constructor 320 is operable to map a request from the application into one or more operations that instantiate the object and to set properties based on the data returned from the data store. As indicated previously, in instantiating an object, the object constructor 320 may combine returned data into a single operation (e.g., "new") to avoid a conceptual operation (e.g., setting a property) that is not supported by the object.

The property getter/setter 325 may be operable to map a request into one or more operations that set properties of application objects based on data returned from the data store. When an object is immutable, a new object may be instantiated and properties set thereon as described previously. Acting as a property setter, the property getter/setter 325 may operate to produce operations that may be used to persist data to the data store.

The query rewriter 335 may operate to transform queries written in a first query language into a second query that operates against the abstract data model. The second query may be represented in a second query language. This may be done by recognizing behaviors specified in an expression, matching patterns in the first query based thereon, and replacing the patterns with operations that operate against the abstract data model as described previously.

The type determiner 337 is operable to return a type to the application based at least in part on data returned from the data store. This may be done as mentioned previously.

The change notifier 340 is operable to send notification of changes to objects to other entities (e.g., to a data access layer).

One or more of the components above may be implemented as one or more processes.

Figure 4:
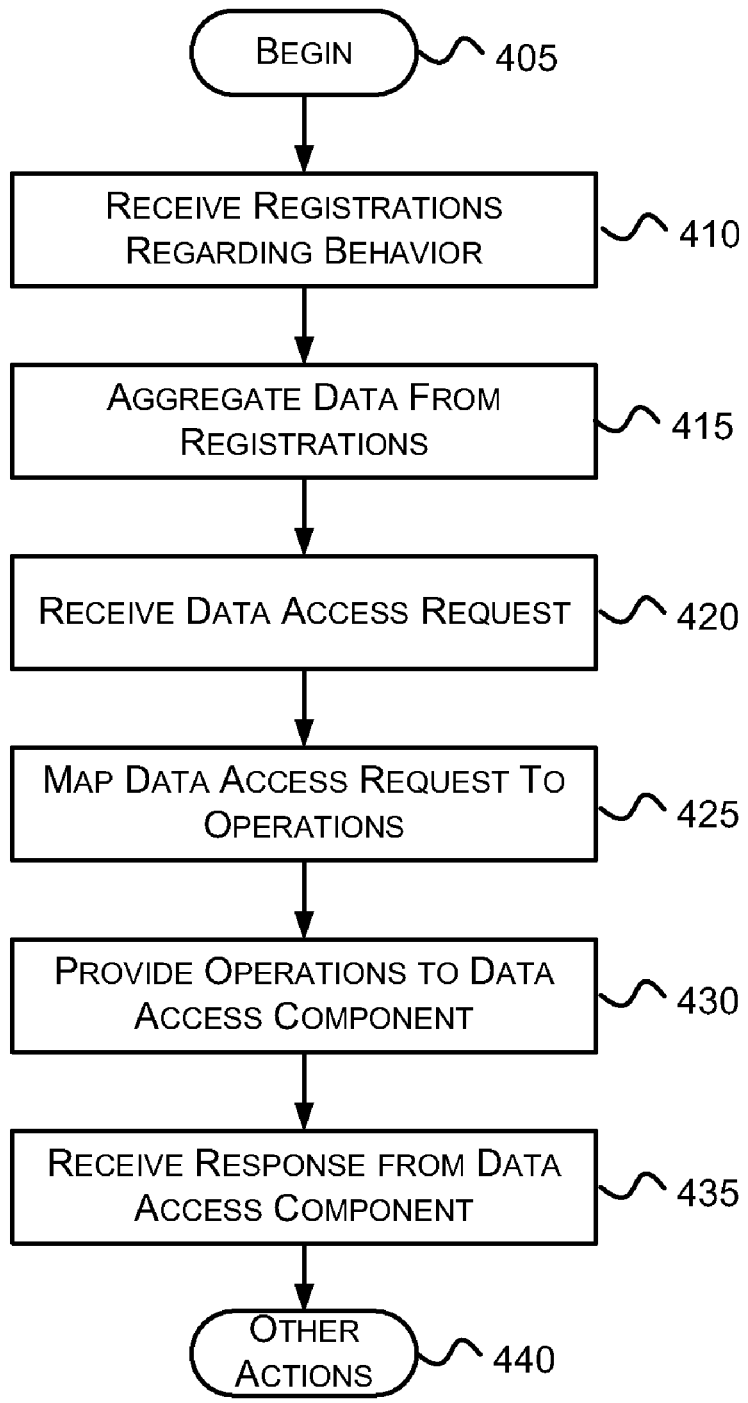
FIG. 4 is a flow diagram that generally represents actions that may occur in a mapper in accordance with aspects of the subject matter described herein.
Figure 5:
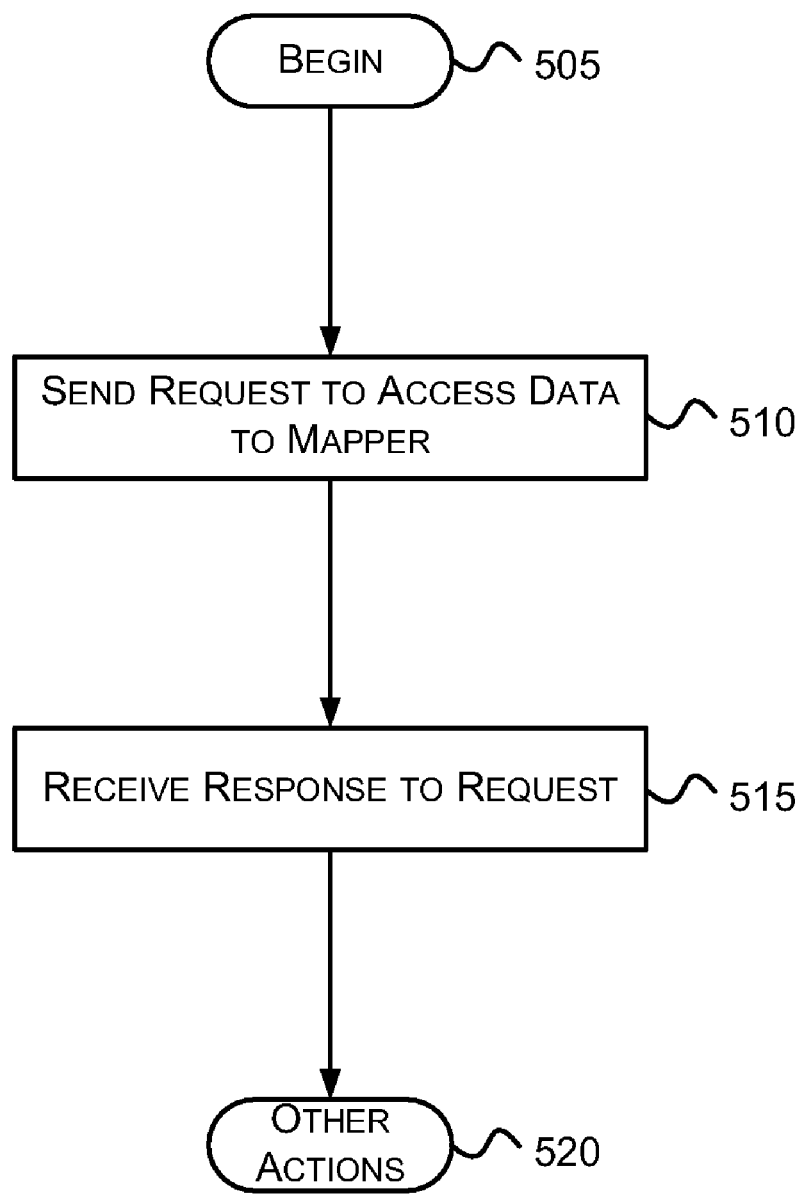
FIG. 5 is a flow diagram that generally represents actions that may occur at an application in accordance with aspects of the subject matter described herein.

FIGS. 4-5 are flow diagrams that generally represent actions that may occur in accordance with aspects of the subject matter described herein. For simplicity of explanation, the methodology described in conjunction with FIGS. 4-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 4 is a flow diagram that generally represents actions that may occur in a mapper in accordance with aspects of the subject matter described herein. At block 405, the actions begin.

At block 410, registrations regarding behavior are received. For example, referring to FIG. 3, a user may register an expression for constructing a new entity from a record.

At block 415, data from registrations is aggregated. For example, referring to FIG. 3, the expression aggregator 315 may aggregate data regarding behavior of objects received.

At block 420, a data access request is received. For example, referring to FIG. 2, the mapper 210 may receive a data access request from the application 205 for an object that conforms to the object model of the application.

At block 425, the data access request is mapped to one or more operations. For example, referring to FIG. 3, using the mapping components 310, the data access request may be mapped into a set of one or more operations that operate on the abstract data model. The mapping components 310 may map the data access based at least in part on an expression that associates a behavior of an object that conforms to the object model to at least one operation associated with the abstract data model.

At block 430, the operations are provided to a data access component. For example, referring to FIG. 2, the mapper 210 provides the operations to the data access layer 215.

At block 435, a response is received from the data access component. For example, referring to FIG. 2, the data access layer 215 responds to the mapper 210.

At block 440, other actions, if any, are performed.

FIG. 5 is a flow diagram that generally represents actions that may occur at an application in accordance with aspects of the subject matter described herein. At block 505, the actions begin.

At block 510, an application sends a request to access data to a mapper. For example, referring to FIG. 2, the application 205 sends a request to access data to the mapper 210.

At block 515, the application receives a response to the request. For example, referring to FIG. 2, after mapping the request to operations that operate on the abstract data model 220 and sending the operations to the data access layer 215, the mapper 210 receives the data from the data access layer 215, inserts data into application objects as appropriate, and sends a response to the application 250.

At block 520, other actions, if any, are performed.

As can be seen from the foregoing detailed description, aspects have been described related to mapping from objects to a data model. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:

receiving a data access request from an application that has objects that conform to an object model of the application, the object model comprising a collection of objects through which the application is able to examine and manipulate application data;

based at least in part on an expression that associates a behavior of an object that conforms to the object model to at least one operation associated with an abstract data model, mapping the data access request into a set of one or more operations that operate on the abstract data model, the abstract data model indicating how data is represented and accessed from a data store; and providing the one or more operations to a data access component to access data corresponding to the request from the data store.

2. The method of claim 1, comprising including, in the abstract data model, one or more of an entity type, a complex type, or a relationship.

3. The method of claim 1, comprising including, in the expression, one or more of a constant, variable, operator, function call, property, action, remote procedure call, or a service call.

4. The method of claim 1, comprising including, in the expression, a lambda expression.

5. The method of claim 1, comprising including, in the set of one or more operations, one or more of a constructor operator, a get property operator, a set property operator, a determine type operator, or a notification operator.

6. The method of claim 1, further comprising notifying the data access component of changes when the object is changed by the application.

7. The method of claim 1, further comprising registering the expression as a strategy that indicates actions to access any arbitrary property of the object.

8. The method of claim 1, the receiving a data access request from an application comprising receiving a query from the application, the query represented in a first query language, and the method further comprising using the expression to translate the query into a second query that operates against the abstract data model, the second query represented in a second query language.

9. The method of claim 1, further comprising inserting the data corresponding to the request into the object.

10. The method of claim 1, further comprising creating a new object and inserting the data corresponding to the request into the new object.

11. The method of claim 1, the providing the one or more operations to a data access component comprising sending instructions to a data access layer to persist data from the object to the data store.

12. The method of claim 1, the receiving a data access request from an application comprising receiving a request for a type of an object and further comprising based at least in part on the expression, obtaining the type.

13. An apparatus, comprising at least one processing unit and at least one computer-readable medium storing instructions executable by the at least one processing unit to facilitate implementation of:
- an expression store operable to store and provide access to expressions that describe behaviors of objects that conform to an object model of an application, the object model comprising a collection of objects through which the application is able to examine and manipulate application data, the behaviors indicating actions to access data associated with the objects;
- an abstract data model store operable to store and provide access to an abstract data model that indicates structure and relationships of data store data corresponding to the application data;
- an expression aggregator operable to receive an expression that describes a behavior of an object that conforms to the object model and further operable to aggregate information about the behavior with other information about other behaviors, if any, of the object;
- a mapping component operable to receive a request from the application to access data pertaining to the object and to map the request into one or more operations that operate on the abstract data model to obtain data from a data store based at least in part on aggregated information, if any, about behavior of the object.

14. The apparatus of claim 13, the mapping component comprising an object constructor operable to map the request into one or more operations that instantiate the object and to set properties based on data returned from the data store.

15. The apparatus of claim 13, the mapping component comprising a property getter operable to map the request into one or more operations that set properties based on data returned from the data store.

16. The apparatus of claim 15, the property getter being further operable to instantiate a new object and set properties thereon if the object described by the expression is immutable.

17. The apparatus of claim 13, the expression aggregator further being configured to register an expression expressed in terms of a declaration that identifies an object that exposes properties of the abstract data model, an entity or complex type understood by the application, and an indication of a service that keeps track of changes to business objects in terms of the abstract data model.

18. The apparatus of claim 15, the mapping component comprising a type determiner operable to return a type to the application based at least in part on data returned from the data store.

19. A computer storage medium having computer-executable instructions, which when executed perform actions, comprising:
- from an application having objects that conform to an object model of the application, sending a request to access data corresponding to an object of the application to a mapper that maps the request into a set of one or more operations that operate on an abstract data model, the abstract data model indicating how data corresponding to the object is represented and accessed from a data store, the mapper mapping the request into the set of one or more operations that operate on the abstract data model based at least in part on an expression that associates a behavior of the object to at least one operation associated with the abstract data model, the object model comprising a collection of objects through which the application is able to examine and manipulate application data; and
- at the application, receiving a response to the request, the response being conveyed in at least one object that conforms to the object model of the application.

20. The computer storage medium of claim 19, the sending a request to access data corresponding to an object of the application to a mapper comprising the application evaluating a query written in a query language other than a query language used by a database obtaining the data from the data store.

* * * * *

UNITED STATES PATENT AND TRADEMARK OFFICE
CERTIFICATE OF CORRECTION

| | | |
|---|---|---|
| PATENT NO. | : 8,150,882 B2 | Page 1 of 1 |
| APPLICATION NO. | : 12/396471 | |
| DATED | : April 3, 2012 | |
| INVENTOR(S) | : Colin Joseph Meek et al. | |

It is certified that error appears in the above-identified patent and that said Letters Patent is hereby corrected as shown below:

In column 3, line 63, after "bus" insert -- 121 --.

In column 3, line 66, after "bus" insert -- 121 --.

In column 4, line 11, after "data" insert -- 147 --.

Signed and Sealed this
First Day of January, 2013

David J. Kappos
*Director of the United States Patent and Trademark Office*